(12) United States Patent
Hartmann et al.

(10) Patent No.: US 10,309,498 B2
(45) Date of Patent: Jun. 4, 2019

(54) BELT TENSIONER (71) Applicant: Schaeffler Technologies AG & Co. KG, Herzogenaurach (DE)

(72) Inventors: Bernd Hartmann, Weisendorf (DE); Zoran Maricic, Furth (DE); Alexander Weidner, Furth (DE); Steffen Gundel, Furth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/574,295

(22) PCT Filed: Jul. 26, 2016

(86) PCT No.: PCT/DE2016/200342
§ 371 (c)(1),
(2) Date: Nov. 15, 2017

(87) PCT Pub. No.: WO2017/028851
PCT Pub. Date: Feb. 23, 2017

(65) Prior Publication Data
US 2018/0135732 A1 May 17, 2018

(30) Foreign Application Priority Data

Aug. 19, 2015 (DE) .................. 10 2015 215 812

(51) Int. Cl.
*F16H 7/08* (2006.01)
*F16H 7/12* (2006.01)

(52) U.S. Cl.
CPC ......... *F16H 7/1218* (2013.01); *F16H 7/1281* (2013.01); *F16H 2007/0806* (2013.01);
(Continued)

(58) Field of Classification Search
CPC .......... F16H 2007/0893; F16H 7/1281; F16H 2007/0874; F16H 2007/0806; F16H 2007/081
(Continued)

(56) References Cited

U.S. PATENT DOCUMENTS 1,557,486 A * 10/1925 Valentine ............... F16H 7/1281
474/135
6,648,783 B1 * 11/2003 Bogner ................. F16H 7/1281
474/134
(Continued)

FOREIGN PATENT DOCUMENTS

DE 102006019877 10/2007
DE 102011085122 4/2013
(Continued)

Primary Examiner — Henry Y Liu
(74) Attorney, Agent, or Firm — Volpe and Koenig, P.C.

(57) ABSTRACT

A belt tensioner (1) for a generator belt drive of an internal combustion engine is provided. The belt tensioner includes a tensioning arm (5) with a tensioning roller (7) mounted thereon, and a tensioning spring which acts on the tensioning arm and is intended for pretensioning the belt (11) is designed for mounting onto the generator (2) and, in the mounted state of the belt drive, engages annularly around the belt pulley (6) of the generator and encompasses the belt in a plane which is spaced apart from the plane of the belt and runs on the far side of the belt plane with respect to the generator. The belt tensioner has an open ring-shaped construction, and therefore, in the mounted state of the belt tensioner on the generator, the belt can be mounted axially through the ring opening (9, 10) in the belt tensioner onto the belt pulley of the generator.

10 Claims, 5 Drawing Sheets

(52) U.S. Cl.
CPC ............... *F16H 2007/0891* (2013.01); *F16H 2007/0897* (2013.01)

(58) Field of Classification Search
USPC ........................................................ 474/135
See application file for complete search history.

(56) References Cited

U.S. PATENT DOCUMENTS

| | | | | |
|---|---|---|---|---|
| 8,002,657 B2* | 8/2011 | Antchak | ............... | F16H 7/1218 |
| | | | | 474/101 |
| 8,821,328 B2* | 9/2014 | Jud | ....................... | F16H 7/1281 |
| | | | | 474/134 |
| 8,968,128 B2* | 3/2015 | Wolf | ..................... | F16H 7/1281 |
| | | | | 474/135 |
| 9,017,197 B2* | 4/2015 | Foster | .................... | F16H 7/1227 |
| | | | | 474/135 |
| 9,097,314 B2* | 8/2015 | Wolf | ..................... | F16H 7/1281 |
| 9,182,015 B2* | 11/2015 | Mack | ..................... | F16H 7/1281 |
| 9,416,853 B2* | 8/2016 | Wolf | ..................... | F02B 67/06 |
| 9,453,561 B2* | 9/2016 | Zacker | .................. | F16H 7/1218 |
| 9,625,013 B2* | 4/2017 | Wolf | ..................... | F16H 7/1281 |
| 9,841,087 B2* | 12/2017 | Hartmann | ............... | F02B 67/06 |
| 2008/0220919 A1* | 9/2008 | Antchak | ............... | F16H 7/1218 |
| | | | | 474/135 |
| 2009/0298631 A1* | 12/2009 | Jud | ....................... | F16H 7/1281 |
| | | | | 474/237 |
| 2011/0070985 A1* | 3/2011 | Deneszczuk | .......... | F16H 7/1281 |
| | | | | 474/135 |
| 2011/0266730 A1* | 11/2011 | Muller | .................. | B60N 2/919 |
| | | | | 267/155 |
| 2013/0040770 A1* | 2/2013 | Wolf | ..................... | F16H 7/1281 |
| | | | | 474/134 |
| 2013/0079185 A1* | 3/2013 | Schauerte | ............. | F16H 7/1281 |
| | | | | 474/135 |
| 2013/0095967 A1* | 4/2013 | Wolf | ..................... | F16H 7/1281 |
| | | | | 474/135 |
| 2013/0203535 A1* | 8/2013 | Mack | .................... | F16H 7/1281 |
| | | | | 474/134 |
| 2014/0256488 A1* | 9/2014 | Wolf | ..................... | F16H 7/1281 |
| | | | | 474/135 |
| 2014/0315673 A1* | 10/2014 | Zacker | .................. | F16H 7/1218 |
| | | | | 474/135 |
| 2014/0342862 A1* | 11/2014 | Wolf | ....................... | F02B 67/06 |
| | | | | 474/117 |
| 2015/0285344 A1* | 10/2015 | Buchen | ..................... | F16H 7/12 |
| | | | | 474/135 |
| 2015/0308545 A1* | 10/2015 | Harvey | ................. | F16H 7/1218 |
| | | | | 474/117 |
| 2015/0369347 A1* | 12/2015 | Wolf | ..................... | F16H 7/1281 |
| | | | | 474/134 |
| 2016/0146312 A1* | 5/2016 | Pfeifer | ...................... | F16H 7/08 |
| | | | | 474/135 |
| 2017/0009850 A1* | 1/2017 | Hartmann | ............... | F02B 67/06 |
| 2017/0082176 A1* | 3/2017 | Buchen | ................. | F16H 7/1281 |
| 2017/0175858 A1* | 6/2017 | Ryeland | ................ | F02B 67/06 |
| 2018/0066733 A1* | 3/2018 | Robertson | ............ | F16H 7/1209 |
| 2018/0202521 A1* | 7/2018 | Reuschel | ............ | F16H 7/1218 |

FOREIGN PATENT DOCUMENTS

| | | |
|---|---|---|
| DE | 102013102562 | 9/2014 |
| DE | 102013203522 | 9/2014 |
| EP | 2557295 | 3/2013 |
| EP | 2573423 | 3/2013 |
| WO | 2013087467 | 6/2013 |

* cited by examiner

BELT TENSIONER

BACKGROUND

The invention relates to a belt tensioner for a generator belt drive of an internal combustion engine. The belt tensioner comprises one or more tensioning arms each with a tensioning roller supported on the arms and a tensioning spring applying a load on the tensioning arm or arms for pretensioning the belt and has a ring-shaped construction for mounting on the generator. In the assembled state of the belt drive, the belt tensioner encompasses the pulley of the generator and covers the belt in a plane that is spaced apart from the belt plane and runs on the other side of the belt plane with respect to the generator.

Such a belt tensioner with only one tensioning arm and accordingly one tensioning roller is known from EP 2 573 423 A1. A belt tensioner also according to the class with two tensioning arms and accordingly two tensioning rollers is known from DE 10 2013 102 562 A1.

In both cases, the belt plane runs axially between the circular ring-shaped tensioning arm bearing of the belt tensioner and the end face of the generator, so that, in the assembled state of the belt drive, the belt is covered by parts of the belt tensioner—in a view toward the belt plane and the generator. Thus, the belt assembly, i.e., installing the belt on the pulley of the generator, is not possible if the belt tensioner is already mounted on the generator. This obstacle can be disruptive both for the initial assembly of the belt drive and also when changing the belt for servicing reasons. This is because the generator and the belt tensioner cannot be delivered to the assembly line of the internal combustion engine as a preassembled structural unit without the belt. Conversely, there is the risk that the belt already placed on the pulley is in the way during the assembly of the belt tensioner on the generator. In addition, changing the belt requires the disassembly of the belt tensioner from the generator.

SUMMARY

The present invention is based on the object of improving the structure of a belt tensioner of the type specified above to promote a significantly simplified assembly of the belt drive.

This objective is achieved in that the belt tensioner has an open, ring-shaped construction, so that the belt can be assembled—and disassembled for servicing—in the assembled state of the belt tensioner on the generator axially through the ring opening of the belt tensioner onto the pulley of the generator. Just the open ring shape of the belt tensioner covering the assembled belt (axially) allows the assembly of the belt tensioner on the generator, before the belt is assembled.

The invention can be adapted not only to belt tensioners according to the publications cited above, but also, in principle, to a belt tensioner according to EP 2 557 295 B1. This belt tensioner has two tensioning arms, wherein one of the tensioning arms is formed by a tensioner housing that supports the other tensioning arm and is itself supported directly on the housing of the generator so that it can pivot. In one modified design, the belt tensioner could be supported on the generator with its opposite end face and would consequently cover the belt with its original pivot bearing area. Also in this case the ring opening would allow the belt assembly for a belt tensioner already mounted on the generator.

If the belt tensioner has a ring-shaped tensioner housing connected rigidly to the generator, it can be sufficient, depending on the individual construction of the belt tensioner and the respective belt, to form the ring opening either only in the tensioning arm or arms or only in the tensioner housing.

The ring opening is to be dimensioned with an appropriate size to promote the easiest possible placement of the belt on the pulley and with respect to the operating belt clearance, but also to be designed with appropriately small dimensions to promote the smallest possible loss of installation space for the support of the tensioning arm or arms and for the tensioning spring.

In a preferred design to be explained in detail below, the belt tensioner should comprise the following:

a ring-shaped tensioner housing for mounting on the generator, wherein the tensioner housing encompasses, in the assembled state of the belt tensioner on the generator, the pulley of the generator, a single ring-shaped tensioning arm that is supported on the tensioner housing so that it can pivot about the pulley of the generator, a single tensioning roller that extends axially between the pivot bearing of the tensioning arm on the tensioner housing on one side and the generator on the other side, and the tensioning spring that is clamped between the tensioner housing and the tensioning arm.

Here, the tensioning arm should be provided with the ring opening for the axial belt assembly.

The tensioning spring is preferably a bow spring that runs parallel to the belt plane in the axial extension area of the tensioning roller. This structural design of the tensioner spring—a bow spring is known to always be a helical compression spring whose longitudinal extent is not straight, but instead has a circular arc shape—makes it possible to limit the spring installation space to a circular arc that extends peripherally completely outside of the pivot area of the tensioning roller and consequently is not overlapped by the operating, pivoting tensioning roller. Because no spring installation space extends in the pivot area of the tensioning roller, the tensioning arm and the tensioning roller can be arranged with a relatively small axial distance to the end face of the generator. This then applies also to the pulley that runs in the same belt plane as the tensioning roller, so that, as a result, an axially compact assembly made from the generator and belt tensioner is produced. Because the belt plane also runs with relatively small axial distance to the generator, the free length of the generator shaft between the pulley and the first bearing point in the generator is also appropriately short to promote relatively minimal wave-like bending.

The belt tensioner can comprise one or more sliding blocks that are fixed on the periphery of the bow spring and support their reaction force on the tensioner housing. In this way, at least one of the sliding blocks should support the spring reaction force in sliding contact with the tensioning arm. By interposing the tensioning arm in the force support of the bow spring on the tensioner housing, the number of sliding contacts and accordingly the flexibility are increased by which the sliding friction parameters influence the vibrational damping of the tensioning arm. Here, the spring reaction force can be supported on the tensioner housing, on one hand, such that one, several, or all sliding blocks are both in sliding contact with the tensioning arm and also with the tensioner housing. On the other hand, there is also the possibility that one, several, or all sliding blocks are only in sliding contact with the tensioning arm. This is the case, for example, when the bow spring is supported on the tensioning arm not only in two-sided axial direction, but also in the radial direction from the outside.

The tensioner housing should have a bow-shaped spring receptacle for holding the bow spring. The spring receptacle is limited peripherally by two walls and the bow spring is clamped between one of the walls on the tensioner housing-side spring end and a driver of the tensioning arm projecting into the spring receptacle on the tensioning arm-side spring end.

Like the tensioning arm, the tensioner housing preferably also has an open ring-shaped construction, wherein its ring opening is defined by the wall on the tensioner housing-side spring end. Depending on the available clearance for the belt assembly and the pivot range of the tensioning roller, a closed ring-shaped tensioner housing is basically also possible.

In addition, the tensioning arm should have a pivot range in which a tensioning arm end limiting the ring opening of the tensioning arm is located peripherally inside the ring opening of the tensioner housing. In other words, the tensioning arm end projects, on the side of the tensioning roller, peripherally beyond the tensioning roller, such that the tensioning arm covers the access to the interior of the tensioner housing in each pivot position of the tensioning roller and protects the belt tensioner from penetrating contamination (water, dust).

The tensioner housing can have multiple parts and can comprise a housing cover on which the tensioning arm is supported axially.

The tensioning arm should be provided with a sliding lining, preferably from polyamide, for the axial and radial support on the tensioner housing.

BRIEF DESCRIPTION OF THE DRAWINGS

Additional features of the invention are given from the following description and from the drawings in which an embodiment of a belt tensioner according to the invention is illustrated. Shown are.

DETAILED DESCRIPTION

Figure 1:
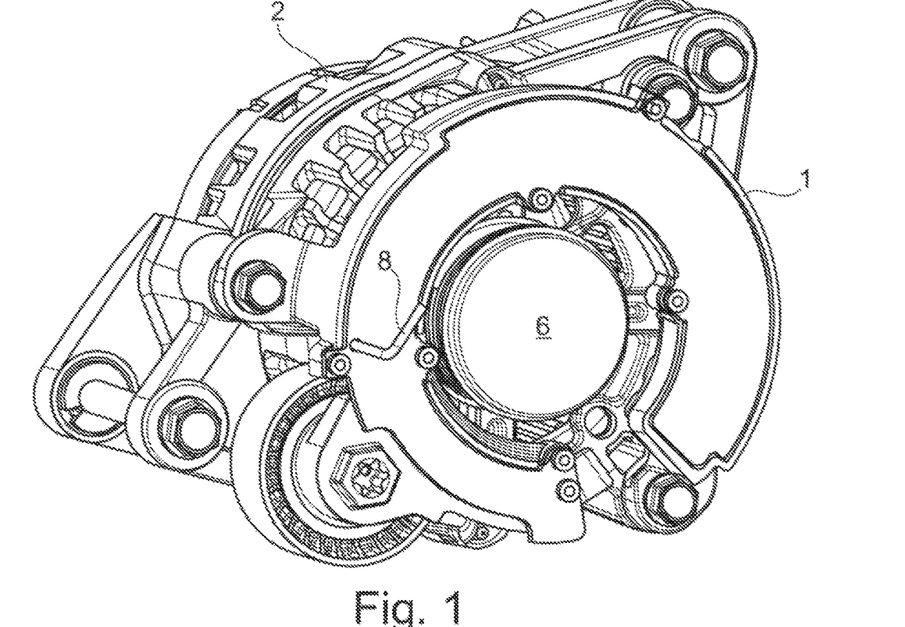
FIG. 1 the generator of a generator belt drive with the belt tensioner mounted on this generator in perspective view, FIG. 2 the belt tensioner in perspective view, FIG. 3 a schematic top view of the mounted belt drive, FIG. 4 a schematic top view of the belt tensioner during the belt assembly, FIG. 5 the belt tensioner in perspective, exploded view, FIG. 6 the tensioner housing of the belt tensioner in perspective, individual part view, FIG. 7 the tensioning arm of the belt tensioner in perspective front view, FIG. 8 the tensioning arm of the belt tensioner in perspective rear view, FIG. 9 the bow spring of the belt tensioner with sliding blocks in perspective view, FIG. 10 one of the sliding blocks in perspective view, FIG. 11 a top view of the belt tensioner in tensioned end position of the tensioning roller, FIG. 12 a top view of the belt tensioner in nominal operating position of the tensioning roller, and FIG. 13 a top view of the belt tensioner in non-tensioned end position of the tensioning roller.
Figure 2:
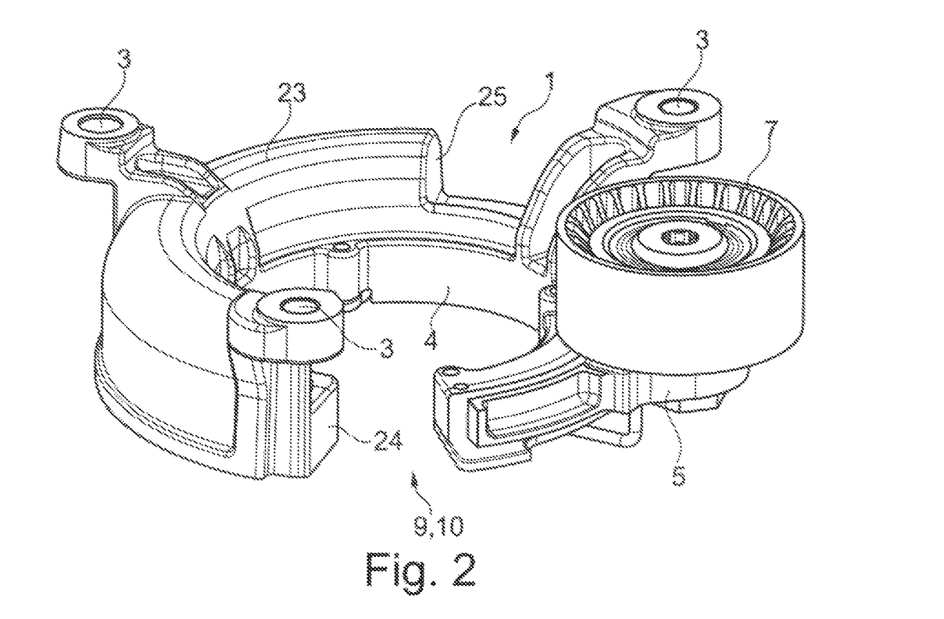

FIGS. 1 and 2 show a belt tensioner 1 according to the invention assembled with the generator 2 of a generator belt drive of an internal combustion engine and as an individual part, respectively. The belt tensioner 1 is mounted on the belt-side end of the generator 2 and here bolted to the generator 2 on three mounting eyes 3. The belt tensioner 1 comprises a ring-shaped tensioner housing 4 and a similarly ring-shaped tensioning arm 5 that each encompass the pulley 6 of the generator 2. Because it is a conventional generator 2 without motor operation, i.e., without a starting function for the internal combustion engine, the belt tensioner 1 has, for pretensioning the belt, only a single tensioning roller 7 in its slack belt section. This roller is supported on the tensioning arm 5 that is supported on its side on the tensioner housing 4 so that it can pivot about the pulley 6. The pivot bearing is concentric to the pulley 6, but could also be arranged in an alternative according to the invention with a slight axial offset, as long as the belt wrapping around the pulley 6 can move freely in the axial direction.

Cooling air is fed into the generator 2 both axially through the ring gap between the interior of the tensioner housing 4 and the pulley 6 and also radially through the gap between the generator 2 and the tensioner housing 4 that springs back by a considerable degree relative to its mounting eyes 3.

The belt tensioner 1 is located in its so-called mounting position in which the tensioning arm 5 and the tensioning roller 7 are located in their clamped end position, without pretensioning the belt. The fixing of this assembly position is realized by pins of the tensioning arm 5 in the tensioner housing 4 by means of a removable locking pin 8.

Figure 3:
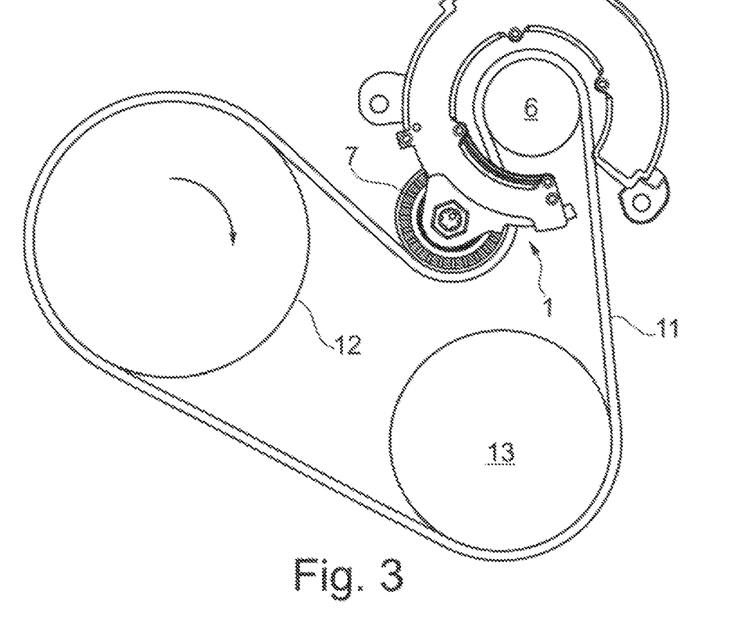

From FIG. 2 it is clear that both the tensioning arm 5 and also the tensioner housing 4 have open, ring-shaped constructions. This is because, without the ring openings 9 and 10 of the tensioning arm 5 or the tensioner housing 4 according to the invention, the assembly of the belt on the structural unit formed of the generator 2 and the belt tensioner 1 according to FIG. 1 would not be possible. This is illustrated by the assembly view with FIG. 3 that shows the mounted belt drive with crankshaft, generator, and air conditioner compressor. The pretensioned poly-V belt 11 with already removed locking pin 8 wraps around the pulleys 6, 12, and 13 of the generator 2, the crankshaft, and the air conditioner compressor. According to the circulating direction of the belt 11 shown on the pulley 12 of the crankshaft, the tensioning roller 7 pretensions the slack section of the belt, which is covered (axially) by the belt tensioner 1. This is because the tensioning roller 7 located in the plane of the belt extends axially between the generator 2 and a plane that is formed by the pivot bearing of the tensioning arm 5 in the tensioner housing 4 and runs on the other side with respect to the generator 2 and in FIG. 3 in front of the plane of the belt.

Figure 4:
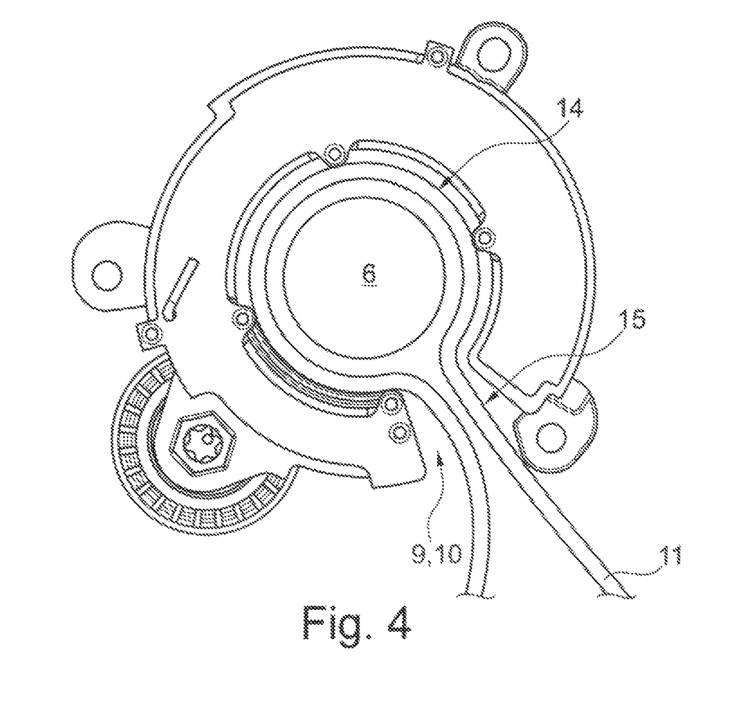

FIG. 4 shows the belt 11 for the axial passage through the ring openings 9 and 10 aligned with each other. Here, the belt 11 is shaped in the area of the pulley 6 into a loop 14 that is significantly larger than the diameter of the pulley 6 before the belt 11 is placed. Therefore, it is possible without a problem to the move the belt 11 with its doubling 15 next to the loop 14 axially through the ring openings 9, 10 and simultaneously over the pulley 6 and then to place its slack section on the tensioning roller in the plane of the belt behind the pivot bearing of the tensioning arm 5 in the tensioner housing 4.

Depending on the spatial relationships on the generator 2 and the belt tensioner 1 mounted on the generator and also as a function of the bending stiffness of the belt 11 in the transverse direction, it is basically also possible to dimension the ring openings 9, 10 smaller and then to guide the two belt sections in a non-doubled state of the correspondingly limited belt 11 one after the other axially through the ring openings 9, 10.

Figure 5:
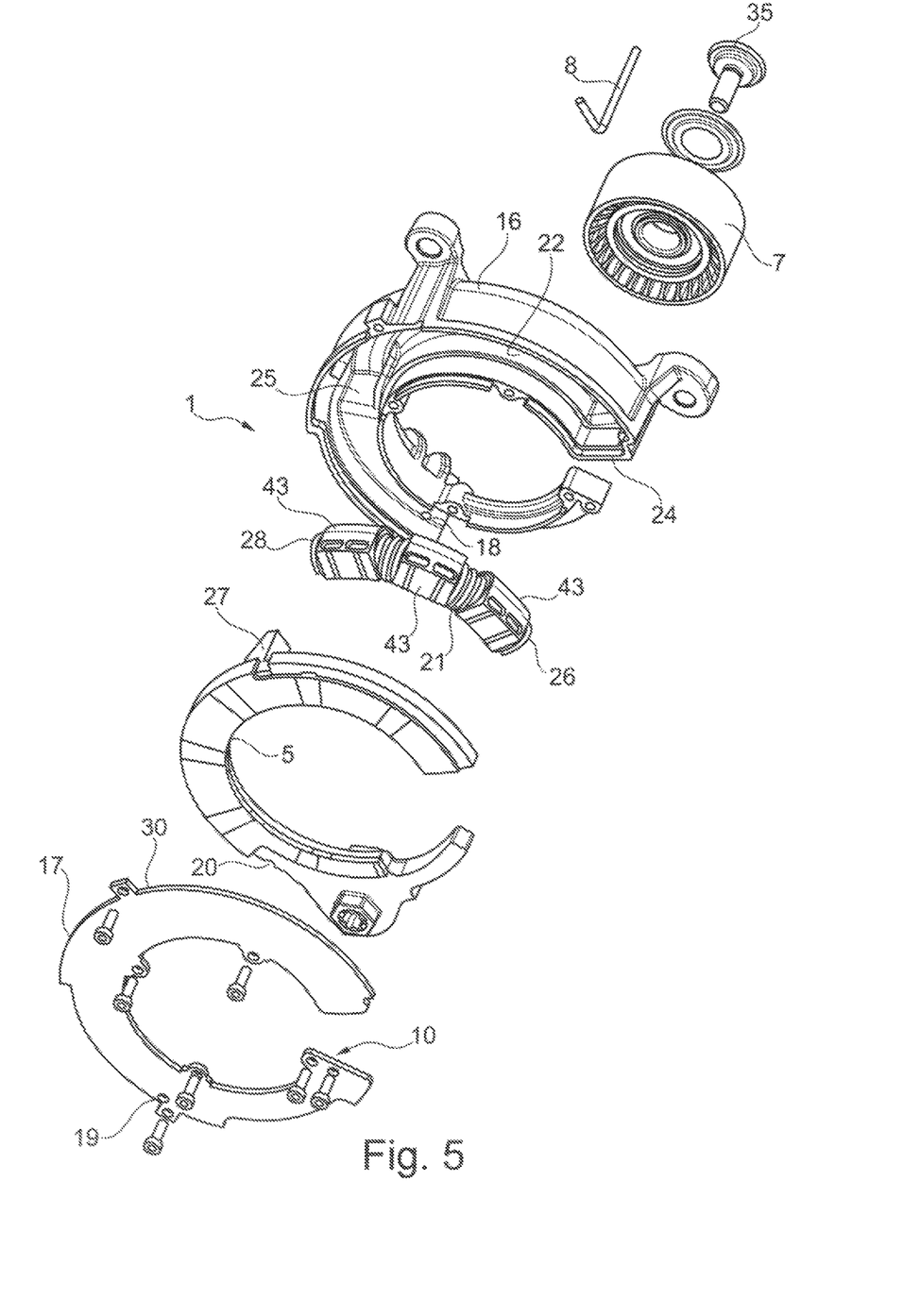

FIG. 5 shows the inner construction of the belt tensioner 1 in an exploded view. The tensioner housing 4 has multiple parts and comprises a housing part 16 and a housing cover 17 that is screwed (alternatively riveted or swaged) to the housing part and has a corresponding open, ring-shaped construction in the area of the ring opening 10 with the housing part 16. The illustration shows the belt tensioner 1 in the assembled position as per FIG. 1 in which the locking pin 8 passes through holes 18 and 19 in the housing part 16 or in the housing cover 17 and a recess 20 aligned with these holes 18, 19 in the tensioning arm 5. The pretensioning introduced into the belt 11 by the tensioning roller 7 is generated by the force of a tensioning spring that is clamped between the housing part 16 and the tensioning arm 5 and applies a force to the tensioning arm 5. The torque generated about the pivot bearing of the tensioning arm 5 acts on the tensioning roller 7, in the counterclockwise direction when viewed toward the front side of the belt tensioner 1 facing away from the generator.

The tensioning spring is a bow spring 21 that runs parallel to the plane of the belt in the axial projection area of the tensioning roller 7 and is held in a corresponding bow-shaped spring receptacle 22 in the housing part 16. The spring receptacle 22 concentric to the pivot bearing of the tensioning arm 5 is—as also shown in FIG. 2—formed by a bulge 23 of the housing part 16 extending axially to the generator 2 and is limited peripherally by two walls 24 and 25. The bow spring 21 is clamped between the wall 24 on the tensioner housing-side spring end 26 and a driver 27 of the tensioning arm 5 projecting axially into the spring receptacle 22 on the tensioning arm-side spring end 28. The ring opening 10 of the tensioner housing 4 is limited by the wall 24.

The bow angle of the un-tensioned bow spring 21 (contrary to the illustration) is approximately 180°. In particular, but nevertheless not only for the case that a larger bow angle is desired, the bow spring is not favorable for this angle, and two or more bow springs could also be provided in series with a correspondingly adapted spring receptacle. Independently, bow springs connected in parallel in the form of a spring assembly with an outer and an inner bow spring are also possible. With the help of these parameters, the overall characteristics of the tensioner suspension on the desired torque profile of the tensioning roller 7 can vary within wide limits.

Figure 12:
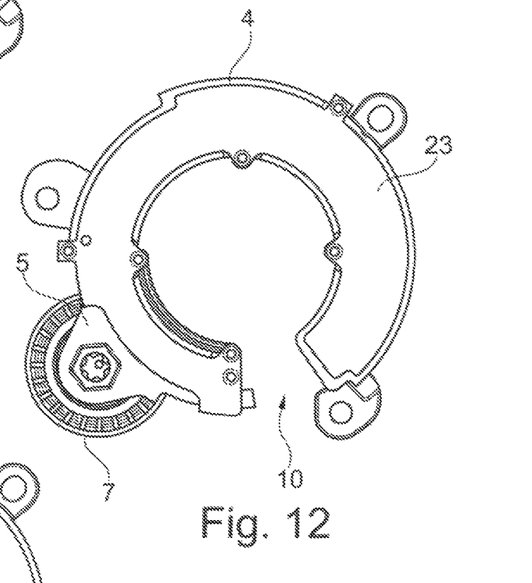

The peripheral angle of the bulge 23 is also approximately 180° and has a center that runs in the nominal operating position of the belt tensioner 1 according to FIG. 12 essentially diametrically opposite the tensioning roller 7. Because the bulge 23 and the bow springs 21 held therein run completely outside of the pivot area of the tensioning roller 7, both the tensioning roller 7 and also the bow springs 21 can be arranged in the plane of the belt to the benefit of the axially very compact construction of the belt tensioner 1.

Figures 6, 7, 8, 9, 10:
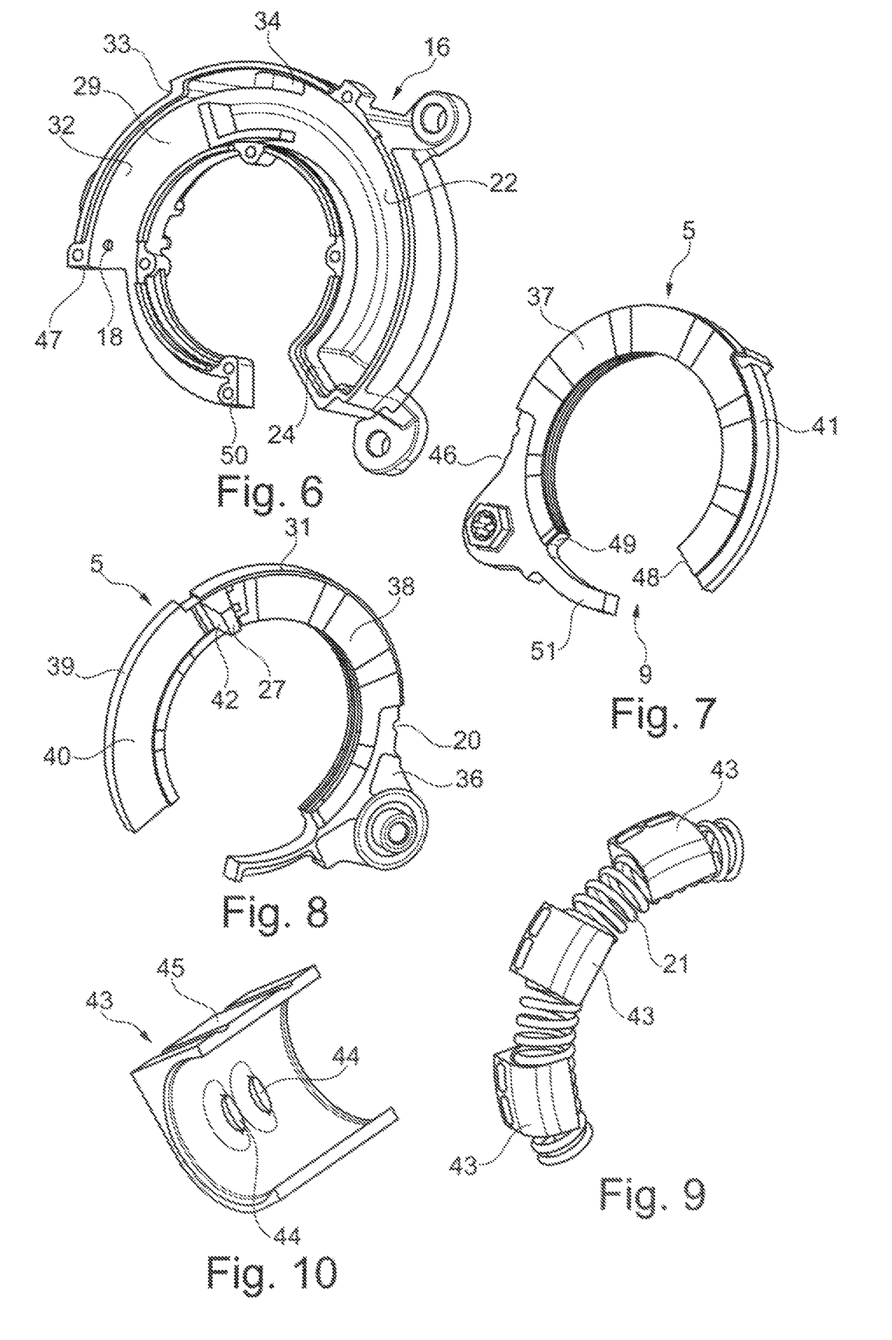

The housing part 16 shown individually in FIG. 6 is an aluminum die-cast part (alternatively, depending on strength requirements, a steel cast part) and the housing cover 17 is a stamped sheet-metal part. The axial bearing of the tensioning arm 5 in the tensioner housing 4 is formed on the side of the generator 2 by an axial end face 29 in the housing part 16 and on the opposite, front side by the inner end face 30 of the housing cover 17. The axial end face 29 is reduced in the area of the spring receptacle 22 to a relatively narrow offset on the inner periphery of the housing part 16. The radial bearing of the tensioning arm 5 in the tensioner housing 4 is formed by the outer lateral surface 31 of the tensioning arm 5 and by the bow-shaped inner lateral surface 32 of an outer ring collar 33 of the housing part 16. The peripheral extension of the radial bearing in the housing part 16 is limited essentially to the bow area between the hole 18 for the locking pin 8 and a step 34 on which the driver 27 is located peripherally in the installation position of the belt tensioner 1.

The tensioning roller 7 supported on a screw 35 on the tensioning arm 5 extends axially between the pivot bearing of the tensioning arm 5 formed by the axial bearing and the radial bearing in the tensioner housing 4 on one side and the generator 2 on the other side.

FIGS. 7 and 8 show the tensioning arm 5 in a perspective front view and rear view, respectively. The tensioning arm 5 has multiple parts and is made from an open ring-shaped base body 36 from die-cast aluminum and for the purpose of its axial and radial sliding bearing in the tensioner housing 4 from a two-part sliding lining made from one of the known sliding bearing plastics, in the present case, polyamide combined with integrated PTFE (polytetrafluorethylene). The sliding lining parts 37 and 38 clipped to the base body 36 cover the outer lateral surface 39 of the base body 36 in the peripheral area between the recess 20 for the locking pin 8 and the driver 27 and partially the two end sides 40 and 41 of the base body 36.

The driver 27 is raised from the base body 36 starting axially on the side of the tensioning roller 7 so that the spring support 42 for the tensioning arm-side spring end 28 runs axially completely next to the base body 36 and on the same side as the tensioning roller 7. An advantage of this arrangement is in that the pair of forces introduced by the bow spring 21 and the tensioning roller 7 into the pivot bearing of the tensioning arm 5 generates a relatively small tilting moment.

FIG. 9 shows the bow spring 21 with three sliding blocks 43 mounted on the spring. The sliding blocks 43 fixed on the outer bow of the bow spring 21 are formed of polyamide and support the reaction force of the bow spring 21 in the radial outward direction and in the two axial directions on the tensioner housing 4. The radial support is realized by the sliding contact of the sliding blocks 43 with the bow-shaped inner lateral surface 32 of the outer ring collar 33 in the area of the spring receptacle 22. The axial support that prevents an axial spreading or bending of the bow spring 21 is realized on the side of the generator 2 by the sliding contact of the sliding blocks 43 with the bulge 23. The opposing axial support on the front side of the belt tensioner 1 facing away from the generator 2 is realized, in contrast, not directly on the tensioner housing 4, but instead by the sliding contact of the sliding blocks 43 with the basic body 36 of the tensioning arm 5 that is supported in a sliding manner in this axial direction with the front sliding lining part 37 on the housing cover 17. The rear sliding lining part 38 facing the generator 2 is narrow in the housing part 16 in the peripheral area of the bow spring 21 corresponding to the relatively narrow axial end face 29 in the peripheral area of the spring receptacle 22 and is left open for the purposes of metal-plastic contact of the sliding blocks 43 with the base body 36.

The fixing, i.e., the nearly stationary holding, with respect to the bow spring 21, of the essentially U-shaped sliding blocks 43 on the periphery of the bow spring 21 is made clear from FIG. 10. The fixing is realized by two axially spaced apart projections 44 on the inner lateral surface of the sliding blocks 43 between which there is a winding of the bow spring 21 in connection with the U-shape encompassing somewhat more than 180° and by which the sliding block 43 is snapped elastically over the spring diameter. The U-shape of the sliding block 43 is not symmetric, wherein the front-side leg has a majority flat contact surface 45 that slides on the similarly flat base body 36.

Due to the plurality of sliding contacts according to the invention, which are formed in the illustrated embodiment by a plastic surface on one side and a metal surface on the other side, a significant amount of play is realized in the coordination of the friction and consequently the operating damping characteristics of the belt tensioner 1. For the coordination of the sliding contacts with respect to their material pairing, surface shape, and roughness, as well as optionally greasing, their relative movements are also to be taken into account. These are larger, for example, for the axial sliding bearing of the bow spring 21 on the base body 36 of the tensioning arm 5, if, in FIG. 5, the sliding contacts of the sliding blocks 43 on the tensioning 5 are viewed starting from the driver 27 in the clockwise direction. Conversely, the relative movements of the sliding contacts between the sliding blocks 43 and the bulge 23 of the housing part 16 are smaller.

Figure 11:
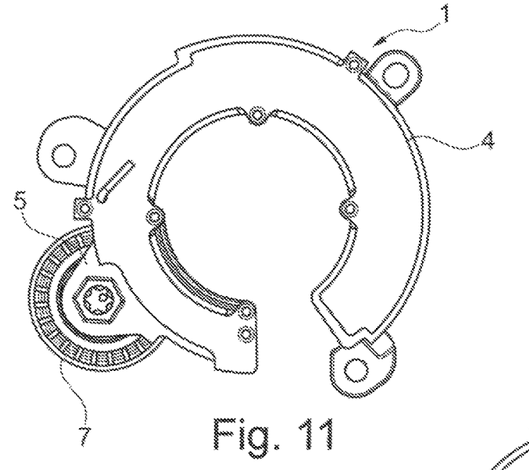
Figure 13:
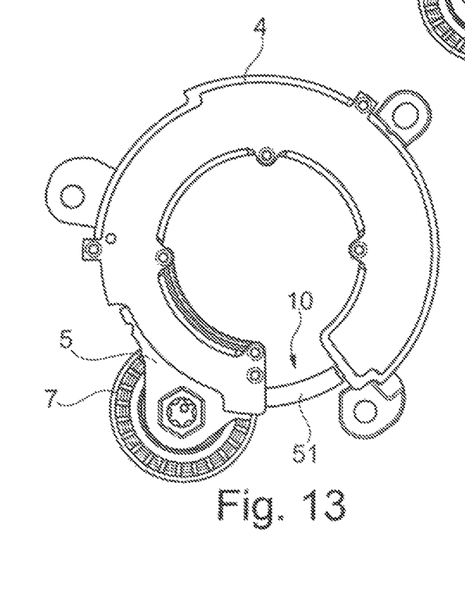

FIGS. 11 to 13 are a comparison of different pivot positions of the tensioning arm 5 with tensioning roller 7 in the tensioner housing 4. FIG. 11 shows the same (tensioned) assembly position of the belt tensioner 1 as in FIGS. 1, 2, and 4. FIG. 12 shows the nominal operating position of the tensioning roller 7 that is pivoted into the same position as in FIG. 3 in the counterclockwise direction and pretensions the belt 11 with nominal force. FIG. 13 shows the untensioned end position in which the tensioning arm 5 is extended with the tensioning roller 7 as far as possible out from the tensioner housing 4.

The pivot range of the tensioning arm 5 is limited by stops. As can be seen from FIGS. 6 and 7, in the present embodiment, there is a projection 46 on the tensioning arm 5 that contacts a peripheral edge 47 on the housing part 16 when the tensioning arm 5 pivots past the assembly position. Alternatively, the ring end 48 of the tensioning arm 5 running within the tensioner housing 4 can also contact the wall 24 of the housing part 16. In the other pivot direction, a step 49 of the tensioning arm 5 contacts the ring end 50 of the tensioner housing 4.

The function of an end section 51 of the tensioning arm 5 adjacent to the step 49 and limiting the ring opening 9 is that the interior of the tensioner housing 4 is to be shielded against the penetration of dirt and spray water already in the assembly position of the belt tensioner 1. In the nominal operating position according to FIG. 12 and in the untensioned end position of the belt tensioner according to FIG. 13, the end section 51 is located peripherally within the ring opening 10 of the tensioner housing 4, without obstructing the circulating belt 11. If necessary, this protective effect can be increased by an additional seal between the tensioner housing 4 and the tensioning arm 5.

LIST OF REFERENCE SYMBOLS

1 Belt tensioner
2 Generator
3 Mounting eye
4 Tensioner housing
5 Tensioning arm
6 Pulley of the generator
7 Tensioning roller
8 Locking pin
9 Ring opening of the tensioning arm
10 Ring opening of the tensioner housing
11 Belt
12 Pulley of the crankshaft
13 Pulley of the air conditioner compressor
14 Loop
15 Doubling
16 Housing part
17 Housing cover
18 Hole
19 Hole
20 Recess
21 Bow spring
22 Spring receptacle
23 Bulge
24 Wall
25 Wall
26 Tensioner housing-side spring end
27 Driver
28 Tensioning arm-side spring end
29 Axial end face in the housing part
30 Inner end face of the housing cover
31 Outer lateral surface of the tensioning arm
32 Inner lateral surface of the outer ring sleeve
33 Outer ring sleeve
34 Step of the housing part
35 Screw
36 Base body of the tensioning arm
37 Front slide lining part
38 Rear slide lining part
39 Outer lateral surface of the base body
40 End side of the base body
41 End side of the base body
42 Spring seat
43 Sliding block
44 Projection on the sliding block
45 Smooth contact surface of the sliding block
46 Projection on the tensioning arm
47 Edge on the housing part
48 Ring end of the tensioning arm
49 Step of the tensioning arm
50 Ring end of the tensioner housing
51 End section of the tensioning arm

The invention claimed is:

1. A belt tensioner for a generator belt drive of an internal combustion engine, the belt tensioner comprising:
a tensioning arm with a tensioning roller supported on the arm,
a tensioning spring applying a load on the tensioning arm adapted for pretensioning a belt,
a tensioner housing adapted for mounting on the generator,
the belt tensioner and the tensioner housing each have an open ring-shaped construction for mounting on the generator and, in a mounted state of the belt drive, the belt tensioner and the tensioner housing are each adapted to encompass a pulley of the generator and cover the belt in a plane that is spaced apart from a belt plane and runs on an other side of the belt plane with respect to the generator,
the open ring-shaped construction, is adapted to allow the belt to be mounted in an assembled state of the belt tensioner on the generator axially through a ring opening of the belt tensioner and a ring opening of the tensioner housing onto the pulley of the generator.

2. The belt tensioner according to claim 1, further comprising:

the tensioning arm being supported on the tensioner housing to pivot about a position where the pulley of the generator is adapted to be located, the tensioning roller extends axially between a pivot bearing of the tensioning arm on the tensioner housing on one side and a position where the generator is adapted to be located on the other side, and the tensioning spring is clamped between the tensioner housing and the tensioning arm, and the tensioning arm is provided with a tensioning arm ring opening for the axial belt assembly.

3. The belt tensioner according to claim 2, wherein the tensioning spring is a bow spring that runs parallel to the belt plane in an axial extension area of the tensioning roller.

4. The belt tensioner according to claim 3, further comprising or more sliding blocks fixed to a periphery of the bow spring that support a reaction force of the bow spring on the tensioner housing, and at least one of the sliding blocks supports the spring reaction force in sliding contact with the tensioning arm.

5. The belt tensioner according to claim 3, wherein the tensioner housing has a bow-shaped spring receptacle defined peripherally by two walls for holding the bow spring that is clamped between one of the walls on a tensioner housing-side spring end and a driver of the tensioning arm that projects into the spring receptacle on a tensioning arm-side spring end.

6. The belt tensioner according to claim 5, wherein the tensioner housing ring opening is defined by the wall on the tensioner housing-side spring end.

7. The belt tensioner according to claim 6, wherein the tensioning arm has a pivot area in which an end section of the tensioning arm defining the tensioning arm ring opening is located peripherally within the tensioner housing ring opening.

8. The belt tensioner according claim 2, wherein the tensioner housing has multiple parts including a housing cover on which the tensioning arm is supported axially.

9. The belt tensioner according to claim 2, wherein the tensioning arm is provided with a slide lining for axial and radial support on the tensioner housing.

10. An assembly comprising a generator of a generator belt drive and the belt tensioner according to claim 1.

* * * * *